United States Patent [19]

Liou

[11] Patent Number: 5,905,312
[45] Date of Patent: May 18, 1999

[54] GRAVITY GENERATING SYSTEM

[76] Inventor: David Liou, No. 40, Tzu Chiang Rd., Chung Ho, Taipei Hsien, Taiwan

[21] Appl. No.: 08/856,016

[22] Filed: May 14, 1997

[51] Int. Cl.[6] ........................................... F03B 9/00
[52] U.S. Cl. ................................. 290/54; 415/5; 60/639
[58] Field of Search ........................... 290/43, 54; 415/5; 60/639

[56] References Cited

U.S. PATENT DOCUMENTS

| | | | |
|---|---|---|---|
| 4,440,427 | 4/1984 | Felton | 290/54 |
| 4,443,707 | 4/1984 | Scieri et al. | 290/4 R |
| 4,462,213 | 7/1984 | Lewis | 60/641.8 |
| 4,718,232 | 1/1988 | Willmouth | 60/495 |
| 4,918,369 | 4/1990 | Solorow | 322/35 |
| 4,948,985 | 8/1990 | Adams | 290/54 |
| 5,684,335 | 11/1997 | Ou | 290/54 |
| 5,755,553 | 5/1998 | Laemthongsawad | 415/3.1 |

*Primary Examiner*—Nestor Ramirez
*Assistant Examiner*—Nicholas Ponomarenko
*Attorney, Agent, or Firm*—Madson & Metcalf

[57] ABSTRACT

The present invention provides a system generating electricity by gravity. This system includes a plurality of tanks mounted on a circulating device. When the tanks receive the working medium descending from a higher place by gravity, the circulating device is driven to circulate along a guiding device so as to drive a working shaft of a generator for generating electricity. A transmission mechanism is added between the circulating device and the working shaft to increase the rotational speed of the working shaft.

15 Claims, 7 Drawing Sheets

GRAVITY GENERATING SYSTEM

FIELD OF THE INVENTION

The present invention is related to a system for generating electricity, and more particularly to a system for generating electricity by gravity.

BACKGROUND OF THE INVENTION

Some conventional methods such as those based on hydropower, firepower, and nuclear power are generally adopted to generate electricity. The method based on hydropower, however, is not proper in Taiwan because of the lack of rapid flow rivers, and it is impossible to generate electricity to meet total demand by this method. The method based on firepower is the most used method in Taiwan. To construct a firepower station capable of generating electricity of 500,000 kilowatts must spend about five years and NT$ 20,000,000,000. The investment can not be returned within twenty years. Besides, combustion of oil or coal will cause environmental pollution which is conspicuous today. The nuclear power method can be used to generate considerable energy, but the nuclear waste is hard to treat. A large amount of water is needed to be supplied to the reactors and to cool the whole system. With respect to the safety and costs, the present invention is developed for generating electricity in a more economical and convenient way.

SUMMARY OF THE INVENTION

An objective of the present invention is to provide a system substituting for the hydropower system for generating electricity more speedily and economically.

Another objective of the present invention is to provide a system for generating considerable electricity.

A further objective of the present invention is to provide a system for generating electricity without polluting environment.

In accordance with the present invention, a system for generating electricity by gravity includes a system body, a circulating device with a plurality of spaced second tanks, a guiding device, a transmission mechanism, and a generator. The guiding device has flutes both limiting the motion of circulating device and protecting the circulating device. There is an upper tank and a first tank mounted above the system body to store the working medium such as water or oil and to adjust the flow rate of the working medium. When the second tanks receive the working medium which descends from the first tank, the gravity of working medium drives the circulating device to circulate along the system body. The circulation of the circulating device then drives a working shaft of a generator to be rotated. A transmission mechanism is mounted between the circulating device and the generator for increasing the rotational speed of the working shaft to achieve the extent required to start the generator.

The working medium in the lowest second tank is poured into a lower tank and then pumped back to the upper tank to be ready for another working cycle. The recovery of working medium makes the present invention more economical than the conventional hydroelectric generating system.

In accordance with another aspect of the present invention, the system body is preferably a truss and the first tank is connected with the system body by a support.

In accordance with another aspect of the present invention, the highest second tank receives the working medium from the first tank and the other second tanks consecutively receives the working medium from the highest second tank in order that the working shaft is continuously driven to be rotated.

In accordance with another aspect of the present invention, the system for generating electricity by gravity further includes an upper tank for supplying the working medium to the first tank, a lower tank for collecting the working medium obtained from the second tanks, and a pumping device for pumping the working medium from the lower tank to the upper tank. The pumping device is preferably a sink pump.

In accordance with another aspect of the present invention, the upper tank preferably includes a stabilizing tank for stabilizing the liquid contained therein, and an inlet tank for receiving the liquid pumped from the lower tank. In accordance with another aspect of the present invention, the stabilizing tank further includes a vertical wall for stabilizing the liquid, a first inlet for the liquid flowing from the inlet tank into the stabilizing tank, a basic outlet for supplying therefrom a fixed amount of the liquid to the first tank, and an adjustable outlet for supplying therefrom an adjustable amount of the liquid to the first tank.

In accordance with another aspect of the present invention, the inlet tank preferably includes a second inlet for the liquid flowing into the inlet tank and an overflow outlet for overflowing therefrom the liquid contained therein.

In accordance with another aspect of the present invention, the system for generating electricity by gravity further includes a momentum stabilizing device for stabilizing a momentum inertia of the working shaft.

In accordance with another aspect of the present invention, the momentum stabilizing device preferably includes a fly wheel accompanied a braking device mounted between the system body and the working shaft for stopping the rotation of the fly wheel before starting operation.

In accordance with another aspect of the present invention, the transmission mechanism includes a first gear mounted on the system body and driven to rotate by the circulating device, a second gear driven to rotate by the first gear in a faster speed than that of the first gear, a third gear coaxially mounted with the second gear on the system body, a fourth gear driven to rotate by the third gear in a faster speed than that of the third gear, a fifth gear coaxially mounted with the fourth gear on the system body, and a sixth gear which is coaxially fixed to the working shaft driven to rotate by the fifth gear in a faster speed than that of the fifth gear.

In accordance with another aspect of the present invention, the circulating device further includes a plurality of parallelly spaced ladder shafts circulatably mounted on the system body, a plurality of connecting pieces respectively connecting together the ladder shafts, and a plurality of fixing pieces respectively fixed to the ladder shafts for respectively fixing thereto the second tanks.

In accordance with another aspect of the present invention, the second tanks further includes a duct for guiding the liquid to downwardly flow to an adjacent second tank below each second tank, an anti-tension strip mounted around the second tanks for preventing deformation of the second tanks, and a baffle plate for optimally collecting therein the liquid downwardly flowing from an adjacent second tank above each second tank. In according with another aspect of the present invention, the second tank has a side inlet and a bottom outlet communicating therebetween the duct.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
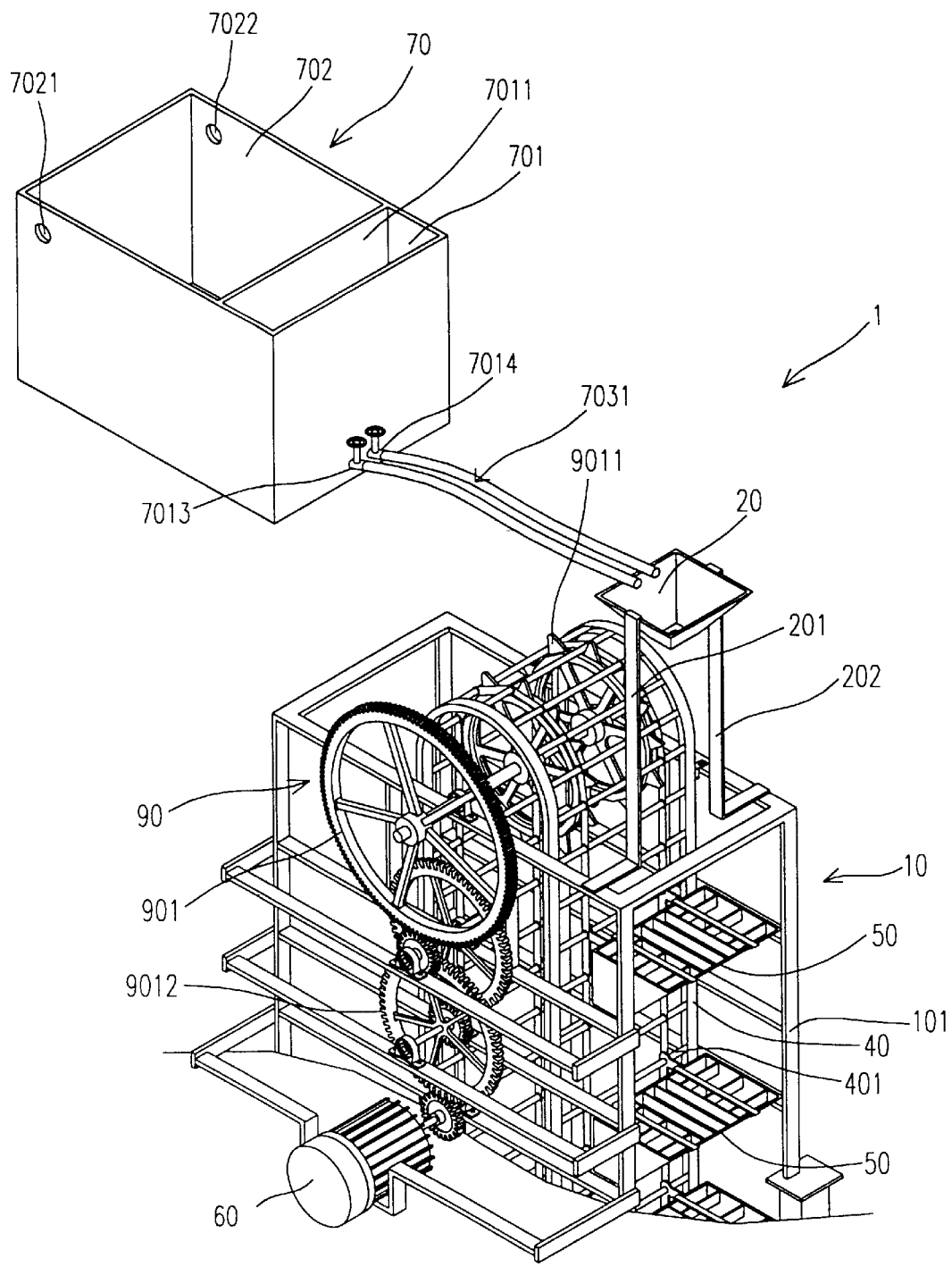
FIG. 1 is a perspective diagram showing an upper part of a preferred embodiment for generating electricity by gravity according to the present invention.

Please refer to FIG. 1. FIG. 1 is a perspective diagram showing an upper part of a preferred embodiment for generating electricity by gravity according to the present invention. A gravity generating system 1 includes a system body 10, a first tank 20, a circulating device 40, a plurality of second tanks 50, a generator 60, and an upper tank 70. The system body 10 is a frame used for supporting other parts of the system 1. The working medium was stored in the upper tank 70 before the operation of the system 1. After the working medium flows to the first tank 20, the working medium flows downwardly into the second tanks 50 which are substantially vertically spacedly mounted on the circulating device 40 and moved vertically due to the impulse as a result of receiving the working medium. The circulating device 40 circulates around the system body 10 continuously corresponding to the downward motion of the second tanks 50, and drives the working shaft 601 to be rotated. The generator 60 then converts the kinetic energy to electric energy. The falling working medium will be pumped into the upper tank 70 for further operation. The theory of this system 1 is to transform potential energy of working medium to electrical energy.

Figure 2:
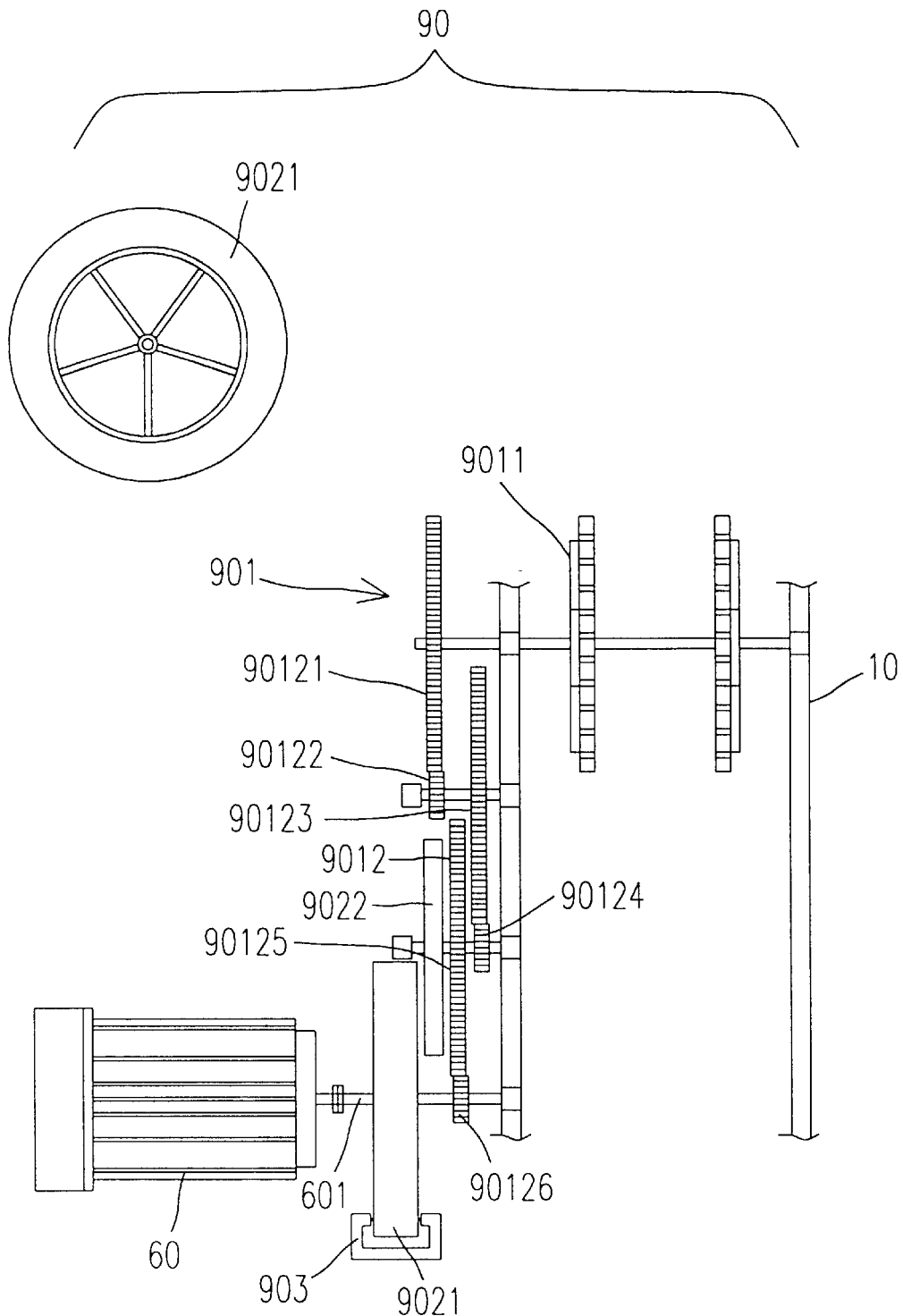
FIG. 2 is a side view showing a momentum stabilizing device according to the present invention.

Please refer to FIG. 2. FIG. 2 is a side view diagram showing a momentum stabilizing device according to the present invention. The momentum stabilizing device 90 mounted on the system body 10 is driven to be rotated by the circulating device 40 for stabilizing the momentum inertia of the working shaft 601. The momentum stabilizing device 90 includes a fly wheel 9021 and a transmission mechanism 901 mounted between the working shaft 601 and the circulating device 40 for increasing rotational speed of the working shaft 601. The transmission mechanism 901 further includes a rotating wheel 9011 connected with the circulating device 40, and a speed-increasing device 9012 for increasing the rotational speed of the working shaft 601. The speed-increasing device 9012 includes a first gear 90121, a second gear 90122, a third gear 90123, a fourth gear 90124, a fifth gear 90125, and a sixth gear 90126. The first gear 90121 is coaxially mounted with the rotating wheel 9011, and the second gear 90122 which is engaged with the first gear 90121 is driven to be rotated by the first gear 90121 in a faster rotational speed than the first gear 90121. Similarly, the third gear 90123 is coaxially mounted with the second gear 90122, and the fourth gear 90124 which is engaged with the third gear 90123 is driven to be rotated by the third gear 90123 in a faster rotational speed than the third gear 90123. As stated above, the fifth gear 90125 is coaxially mounted with the fourth gear 90124, and the sixth gear 90126 which is engaged with the fifth gear 90125 is driven to be rotated by the fifth gear 90125 in a faster rotational speed than the fifth gear 90125. The sixth gear 90126 is mounted coaxially with the fly wheel 9021 and the generator 60, and the fifth gear 90125 is mounted coaxially with the second fly wheel 9022. The braking device 903 is used for stopping the rotation of the fly wheel 9021 before its starting operation till the whole system 1 is ready. When the system 1 is not ready, that is, the upper tank 70 is not fed with an enough working medium, the braking device 903 is wedged into the fly wheel 9021 by the operator so that the fly wheel 9021 can not be rotated. Because of the engagement among gears and circulating device 40, the gears and circulating device 40 can not be rotated either. Once the system 1 is ready, the braking device 903 is withdrawn from the fly wheel 9021 to start the operation.

Figure 3:
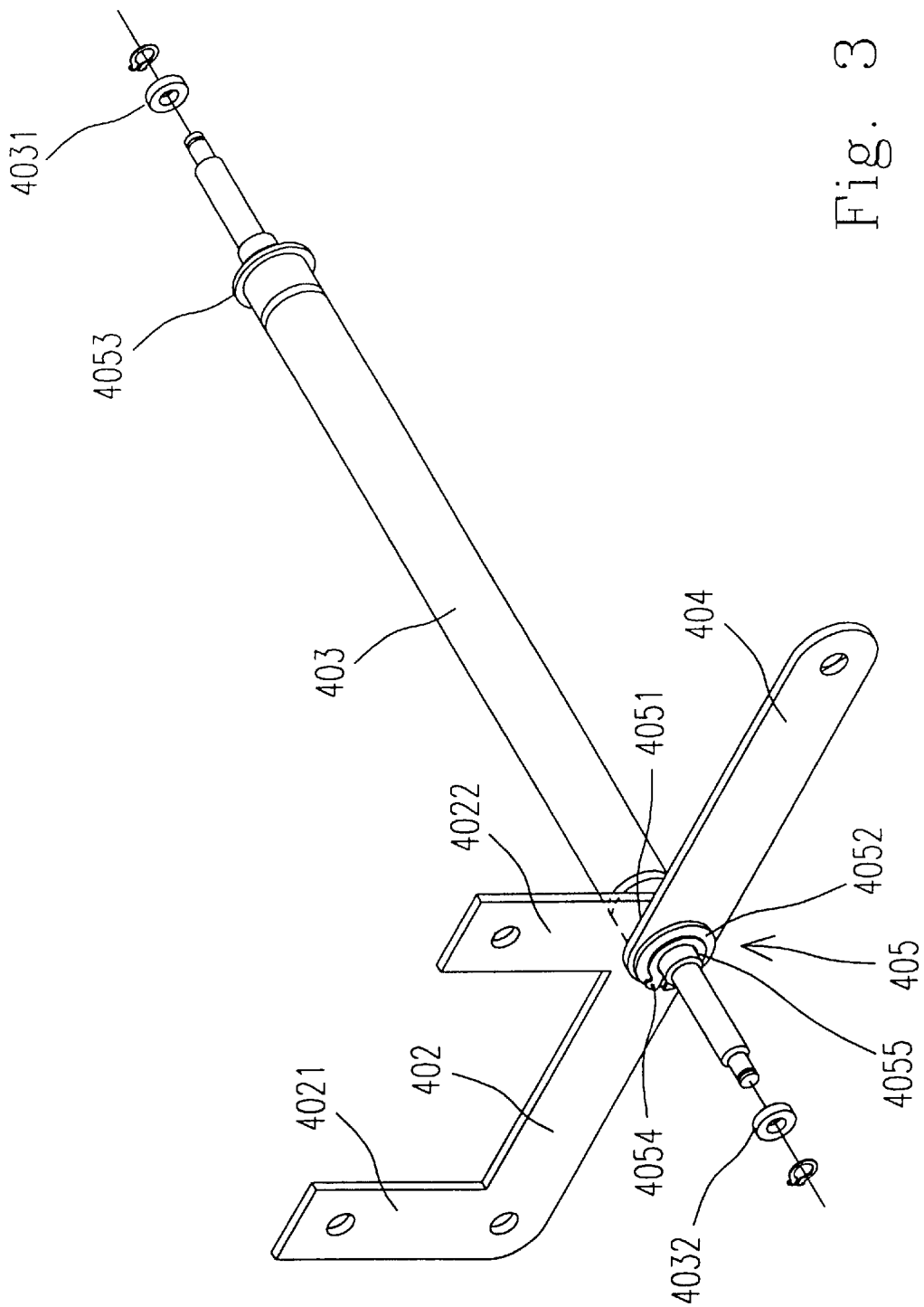
FIG. 3 is a detail drawing showing parts of a circulating device according to the present invention.
Figure 4:
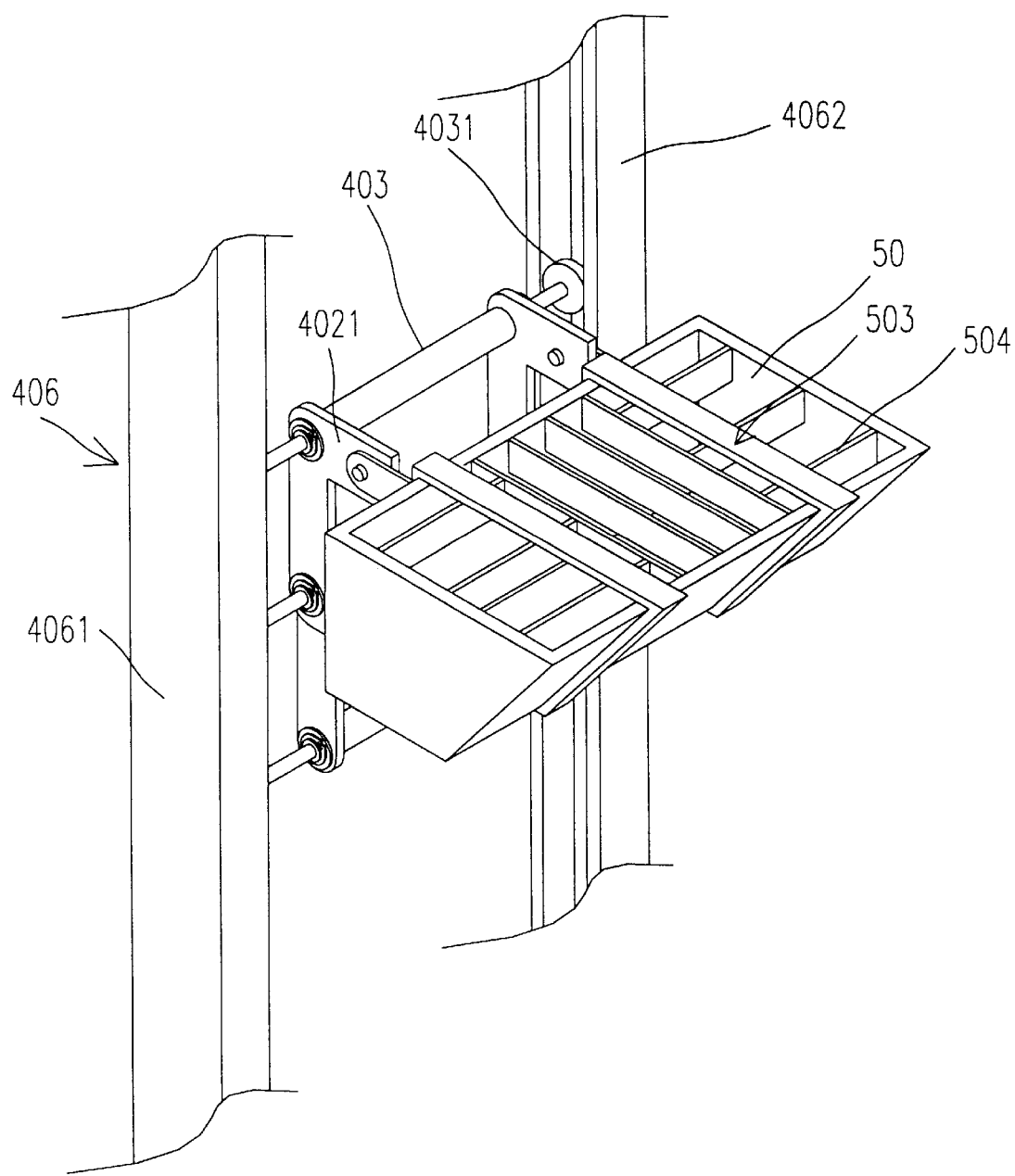
FIG. 4 is a perspective diagram showing a second tank and parts of a circulating device according to the present invention.
Figure 5:
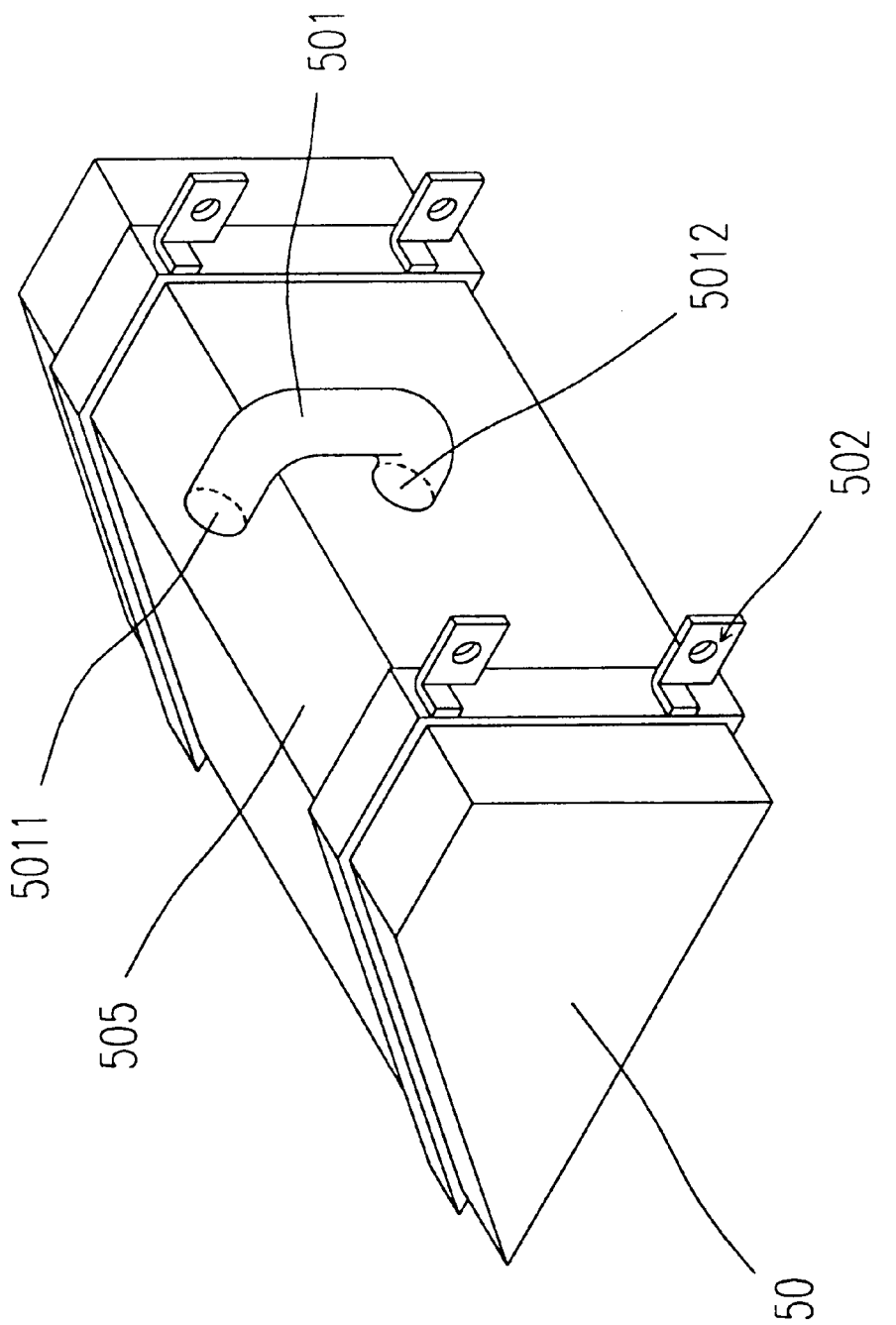
FIG. 5 is a bottom view showing a second tank according to the present invention.

Please refer to FIG. 3 and FIG. 4 showing parts of the circulating device according to the present invention. Part of the circulating device 40 includes a ladder shaft 401, a fixing piece 402, a moving shaft 403, a connecting piece 404, a locking device 405, and a guiding device 406. The second tank 50 is connected with the ladder shaft 401 by the fixing piece 402 having two arms 4021 and 4022 with equal length. The two arms 4021 and 4022 can support the weight of the second tank 50. The connecting piece 404 is used for transferring the momentum of the moving shaft 403 which is used for transferring the momentum of the fixing piece 402. The locking device 405 for preventing breakaway of the fixing piece 402 and the connecting piece 404 includes a pair of rings 4052 and 4053, a C-type ring 4054, and a trough 4055. The ring 4052 and the C-type ring 4054 can limit the moving of the fixing piece 402 and the connecting piece 404 in the region 4051. The guiding device 406 for guiding the ladder shafts 401 to circulate along the system body 10 includes two circulating flutes 4061 and 4062 as the moving paths of pulleys 4031 and 4032 connected with the ladder shaft 401. Please refer to FIG. 4 and FIG. 5 showing the structure of one second tank according to the present invention. The second tank 50 includes a duct 501, four fixing slices 502, an anti-tension strip 503, and a baffle plate 504. The duct 501 which is used for guiding the working medium to downwardly flow to an adjacent second tank 50 below each second tank 50 has a side inlet 5012 and a bottom outlet 5011 under the bottom 505 of the second tank 50. The fixing slices 502 are used for fixing the second tank 50 on the circulating device 40. The anti-tension strip 503 mounted around the second tank 50 is used for preventing deformation of the second tank 50. The baffle plate 504 mounted over the second tank 50 is used for optimally collecting the working medium without splashing.

Figure 6:
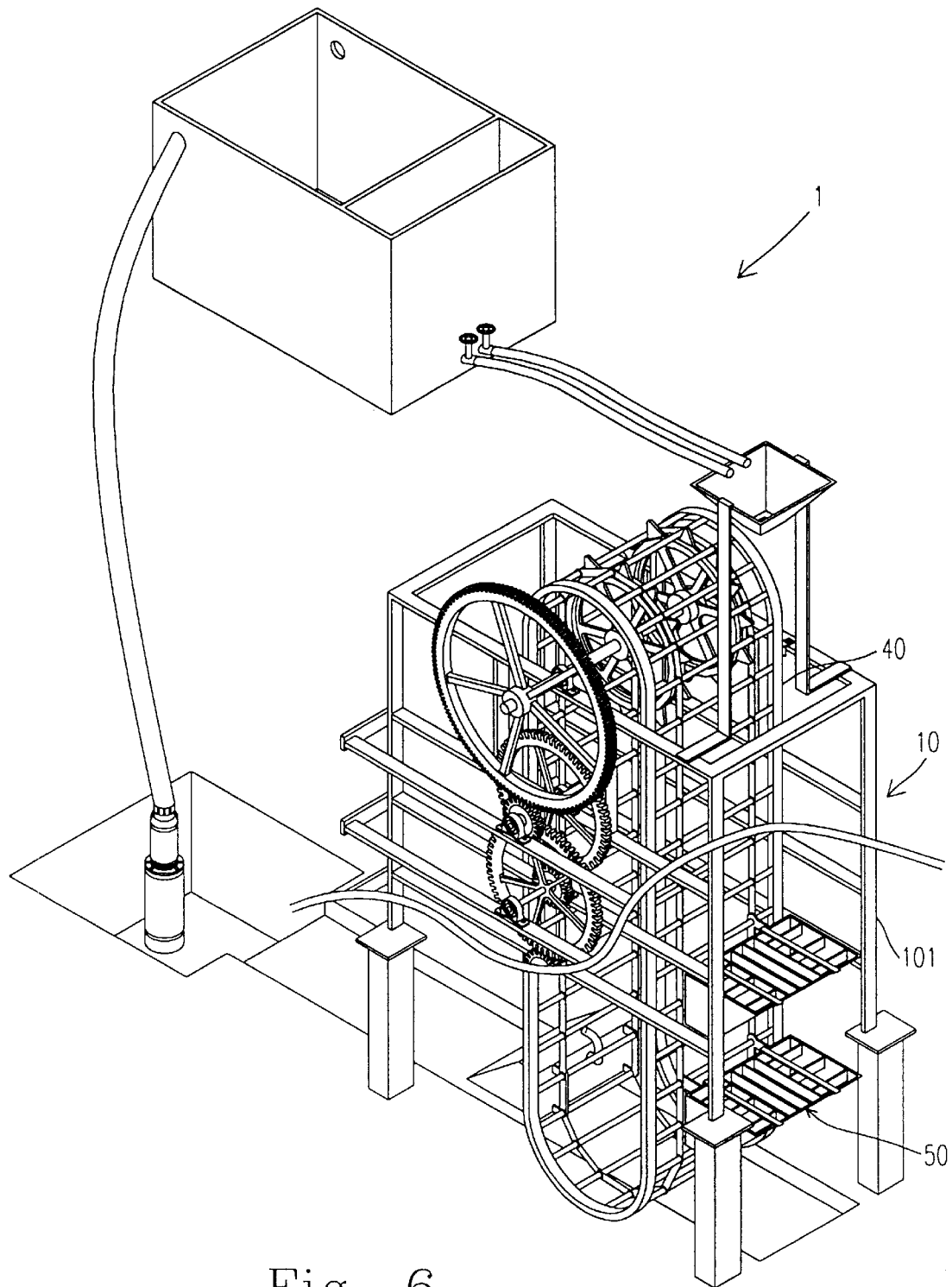
FIG. 6 is a perspective diagram showing a gravity generating system according to the present invention.

FIG. 6 is a perspective diagram showing a whole circulating device according to the present invention. The system body 10 is a truss 101. The system body 10, the circulating device 40, and the second tanks 50 constitute main part of this system 1 for generating electricity by gravity.

Figure 7:
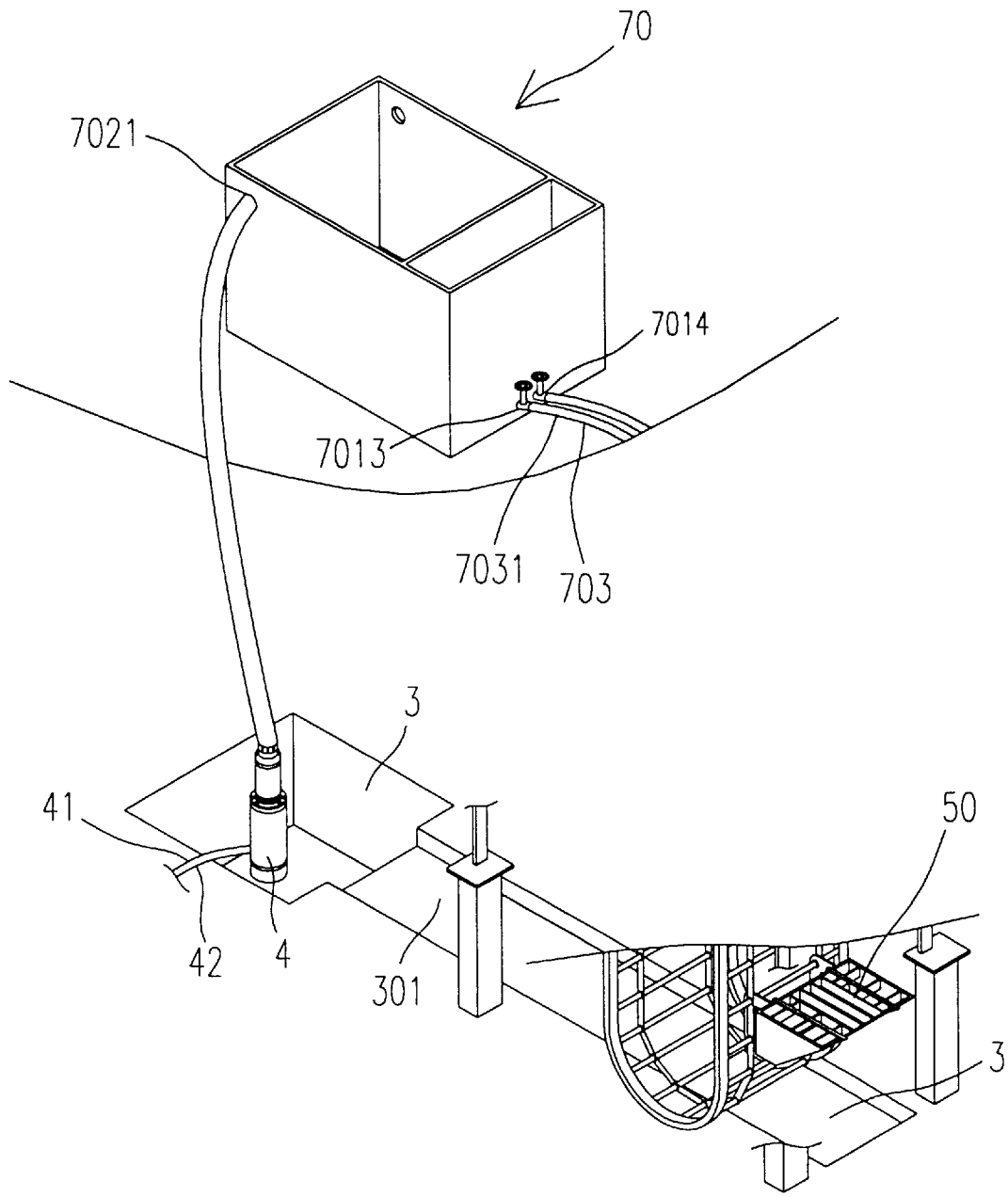
FIG. 7 is a perspective diagram showing an upper tank and a lower part of this preferred embodiment according to the present invention.

FIG. 7 is a perspective diagram showing an upper tank and a lower part of this preferred embodiment according to the present invention. The upper tank 70 for supplying the working medium to the first tank 20 includes a stabilizing tank 701 for stabilizing the working medium, and an inlet tank 702 for receiving the working medium pumped from the lower tank 3 by the pumping device 4. As indicated in the FIG. 1, the stabilizing tank 701 includes a vertical wall 7011 for stabilizing the working medium, a first inlet (not shown) for the working medium flowing from the inlet tank 702 into the stabilizing tank 701, a basic outlet 7013 and an adjustable outlet 7014 for supplying fixed and adjustable amount of the working medium to the first tank 20 via ducts 7031. The inlet tank 702 has a second inlet 7021 for the working medium flowing in and an overflow outlet 7022 for draining the excess working medium out. The lower tank 3 is used for collecting the working medium splashing from the second tanks 50 or the working medium poured from the second tanks 50 by a canal structure 301.

Thus, the elements of the present invention include a working medium to be descended from a higher place by gravity, a working shaft 601 to be rotated around an axis by the descending working medium, and a generator 60 driven by the working shaft 601 for generating electricity.

To supply electricity of 500,000 kilowatts, it requires less than one year and less than NT$ 100,000,000 to construct a power station according to the present invention. Compared to a conventional method based on firepower, the present system is more economical. Besides, no pollution is. In a preferred embodiment, a 30 meters height circulating device is accompanied with a 3 horsepower pumping device capable of pumping 60 gallons water in a minute. Ten second tanks are vertically moved with a speed of 30 meters in a minute. The amount of circulating water is about 2,000 kilograms. In another example, a 30 meters height circulating device is accompanied with a 3 horsepower pumping device capable of pumping 600 gallons water in a minute. Ten second tanks are vertically moved with a speed of 20 meters in a minute. In such preferred embodiments, the quantity of generated electricity may be adjusted by changing the scale of the system including height of the circulating device, amount of the circulating water, etc. Easy operation and maintenance is also a remarkable advantage of the system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What I claim is:

1. A system for generating an electricity by gravity comprising:

a system body;

a circulating device circulatably mounted on said system body for circulating along said system body;

a generator having a working shaft and driven by said circulating device for generating said electricity;

a first tank mounted above said system body loading a working medium;

a plurality of second tanks vertically spacedly mounted on said circulating device for receiving said working medium from said first tank in turn for driving said circulating device to be rotated along said circulating device, a guiding device secured to said system body for guiding said circulating device to circulate along said guiding device; and a transmission mechanism mounted between said circulating device and said generator for increasing a rotational speed of said working shaft of said generator.

2. A system according to claim 1, wherein a highest second tank receives said working medium from said first tank so that said circulating device is continuously driven to be rotated.

3. A system according to claim 1, further comprising and upper tank for supplying said working medium to said first tank.

4. A system according to claim 3 wherein said working medium is a liquid and said upper tank includes a stabilizing tank for stabilizing said liquid contained therein.

5. A system according to claim 4 wherein said stabilizing tank further includes:

a basic outlet for supplying therefrom a fixed amount of said working medium to said first tank;

an adjustable outlet for supplying therefrom an adjustable amount of said working medium to said first tank; and an overflow outlet for overflowing therefrom said working medium contained therein.

6. A system according to claim 1, further comprising a momentum stabilizing device for stabilizing a momentum inertia of said working shaft.

7. A system according to claim 6 wherein said momentum stabilizing device is a fly wheel.

8. A system according to claim 1 wherein said transmission mechanism includes:

a first gear mounted on said system body and driven to rotate by said circulating device;

a second gear driven to rotate by said first gear in a faster speed than that of said first gear;

a third gear coaxially mounted with said second gear on said system body;

a fourth gear driven to rotate by said third gear in a faster speed than that of said third gear;

a fifth gear coaxially mounted with said fourth gear on said system body; and a sixth gear driven to rotate by said fifth gear in a faster speed than that of said fifth gear.

9. A system according to claim 8 wherein said sixth gear is coaxially fixed to said working shaft.

10. A system according to claim 9, further comprising a braking device mounted between said system body and said working shaft.

11. A system according to claim 1, further comprising:

a lower tank for collecting therein said working medium obtained from said second tanks; and a pumping device for pumping said working medium from said lower tank to said upper tank.

12. A system according to claim 1 wherein said circulating device includes:

a plurality of parallelly spaced ladder shafts circulatably mounted on said system body;

a plurality of connecting pieces respectively connecting together said ladder shafts;

a plurality of fixing pieces respectively fixed to said ladder shafts for respectively fixing thereto said second tanks; and a guiding device secured to said system body for guiding said ladder shafts to circulate along said system body.

13. A system according to claim 1 wherein each of said second tanks includes:

a duct for guiding said working medium to downwardly flow to an adjacent said second tank below said each second tank; and a baffle plate for optimally collecting therein said working medium downwardly flowing from an adjacent said second tank above said each second tank.

14. A system according to claim 13 wherein said each second tank has a side inlet and a bottom outlet communicating therebetween said duct.

15. A system according to claim 1 wherein said guiding device has a flute for guiding said circulating device to circulate therealong in said flute.

* * * * *